No. 860,952. PATENTED JULY 23, 1907.
H. WHITE.
COMPENSATING GEARING FOR MOTOR VEHICLES.
APPLICATION FILED APR. 30, 1904.

5 SHEETS—SHEET 1.

Witnesses
G. Howard Walmsley
Irvine Miller

Inventor
Henry White,
By H. A. Toulmin
Attorney

No. 860,952. PATENTED JULY 23, 1907.
H. WHITE
COMPENSATING GEARING FOR MOTOR VEHICLES.
APPLICATION FILED APR. 30, 1904.

5 SHEETS—SHEET 3.

Witnesses
G. Howard Walmsley
Irene Miller

Inventor
Henry White,
By H. A. Toulmin.
Attorney

No. 860,952. PATENTED JULY 23, 1907.
H. WHITE.
COMPENSATING GEARING FOR MOTOR VEHICLES.
APPLICATION FILED APR. 30, 1904.

5 SHEETS—SHEET 4.

Inventor
Henry White,

Witnesses

By
Attorney

No. 860,952.  PATENTED JULY 23, 1907.
H. WHITE.
COMPENSATING GEARING FOR MOTOR VEHICLES.
APPLICATION FILED APR. 30, 1904.

5 SHEETS—SHEET 5.

Witnesses
G. Howard Walmsley.
Irvine Miller.

Inventor
Henry White,
By H. A. Toulmin.
Attorney

UNITED STATES PATENT OFFICE.

HENRY WHITE, OF MARION, OHIO, ASSIGNOR TO THE WHITE ENGINEERING COMPANY, OF MARION, OHIO, A CORPORATION OF OHIO.

COMPENSATING GEARING FOR MOTOR-VEHICLES.

No. 860,952.     Specification of Letters Patent.     Patented July 23, 1907.

Application filed April 30, 1904. Serial No. 205,737.

*To all whom it may concern:*

Be it known that I, HENRY WHITE, a citizen of the United States, residing at Marion, in the county of Marion and State of Ohio, have invented certain new and useful Improvements in Compensating Gearing for Motor-Vehicles, of which the following is a specification, reference being had therein to the accompanying drawings.

This invention relates to compensating gearing for motor vehicles, and has for its object to provide a construction whereby a vehicle of the four wheel type, the front wheels being steering wheels, may have its wheels, both rear and front, all so connected to a suitable motor that all of the wheels act as driving wheels, the transmission gearing compensating for the difference in speed of revolution of the different wheels arising from inequalities of the roadway or changes in the direction of travel of the vehicle, and being a balanced gearing of a character such as to divide the power equally between the four wheels.

To these ends my invention consists in certain novel features which I will now proceed to describe, and will then particularly point out in the claims.

Figure 1:
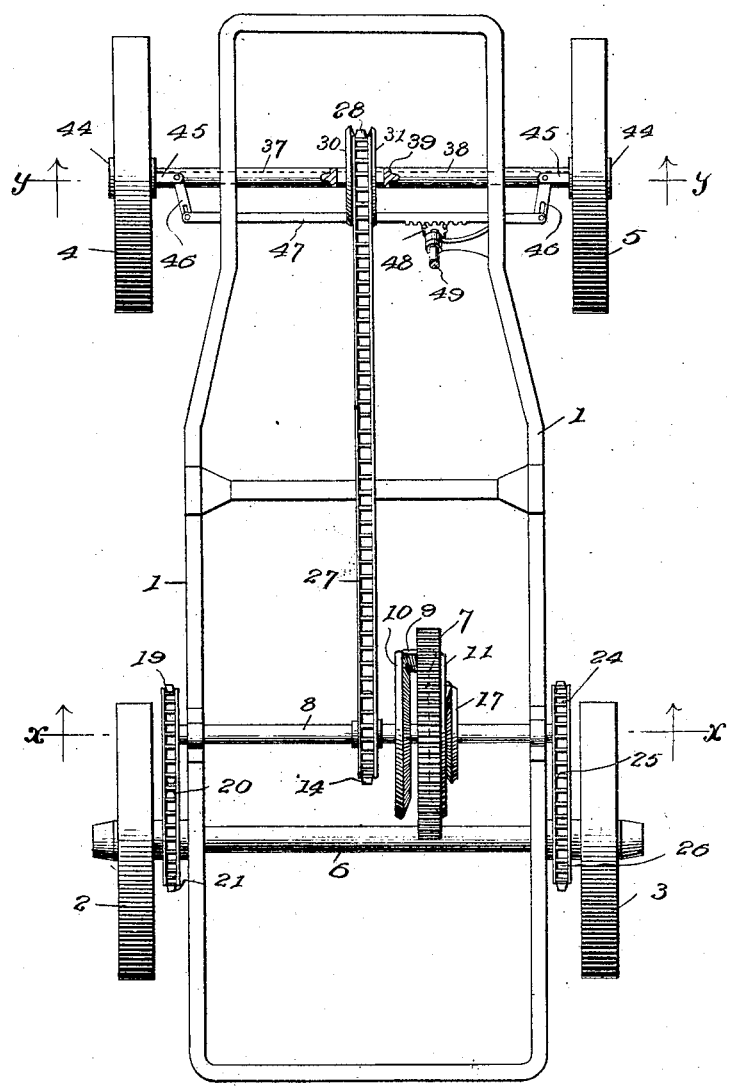
Figure 2:
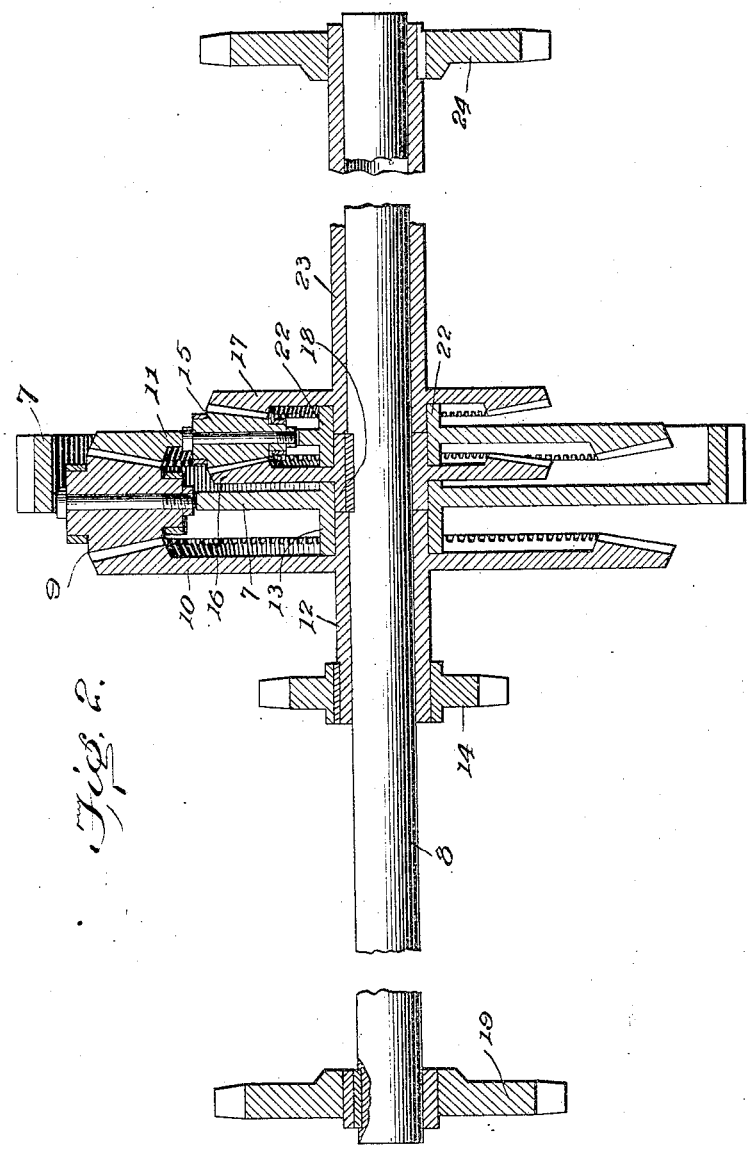
Figure 3:
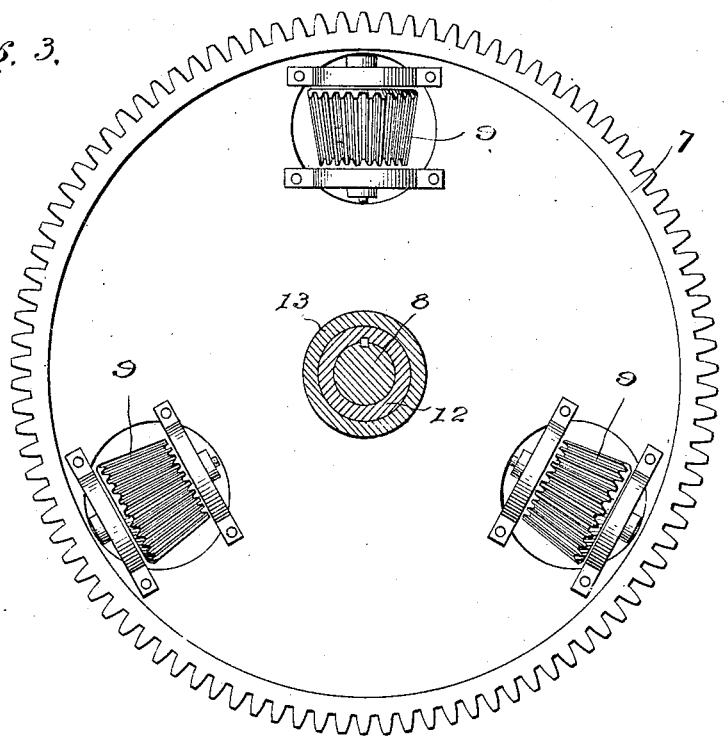
Figure 4:
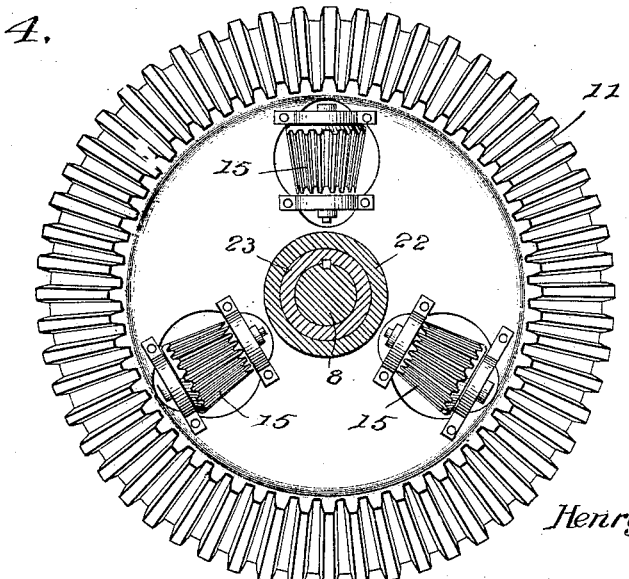
Figure 5:
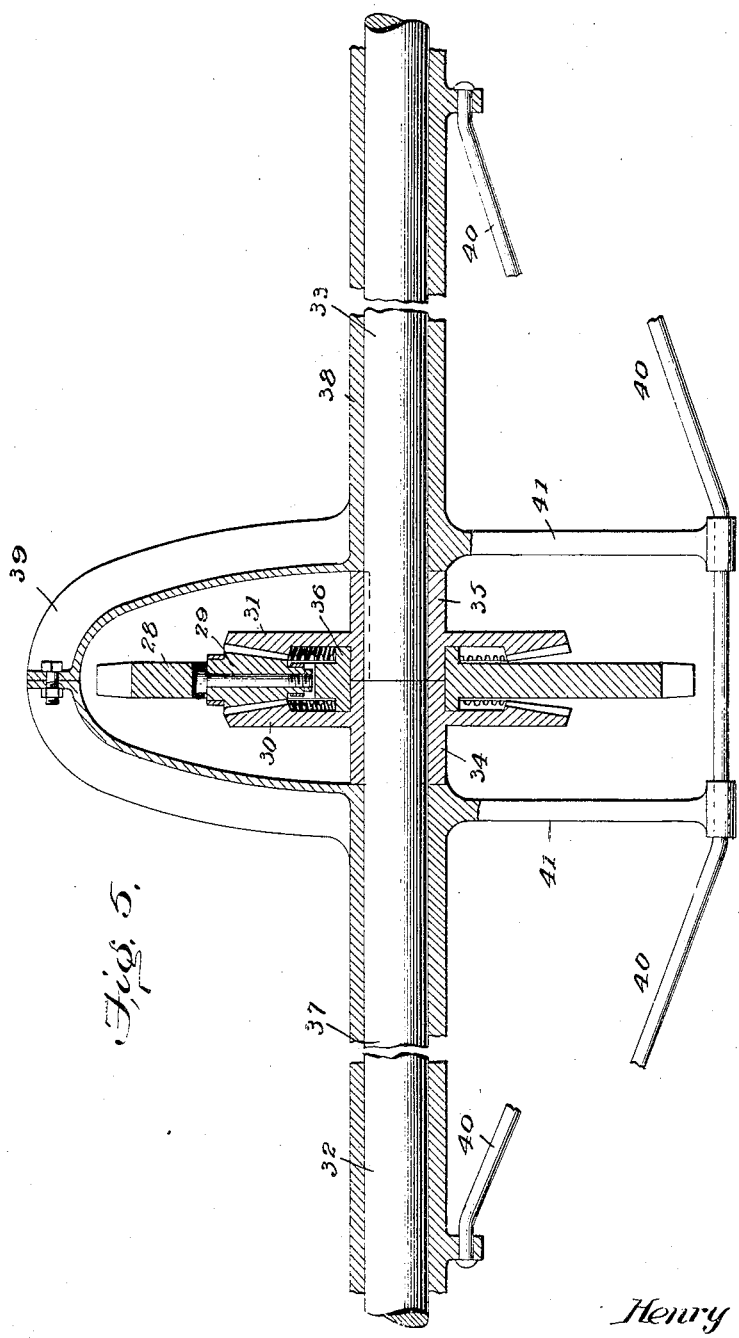
Figure 6:
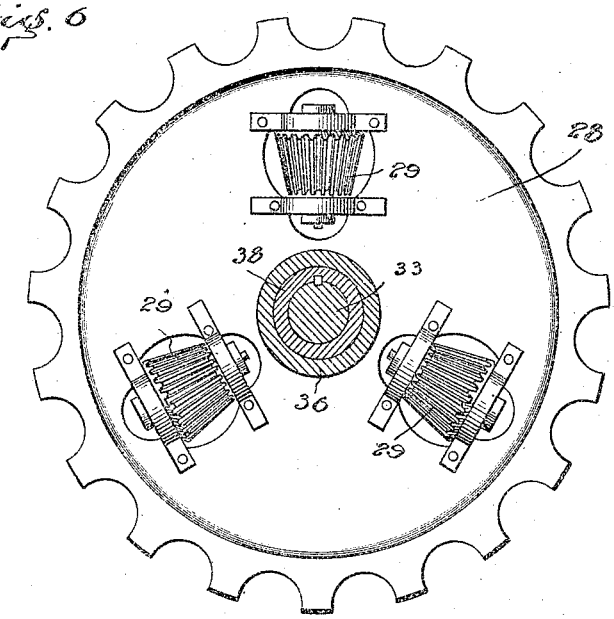
Figure 7:
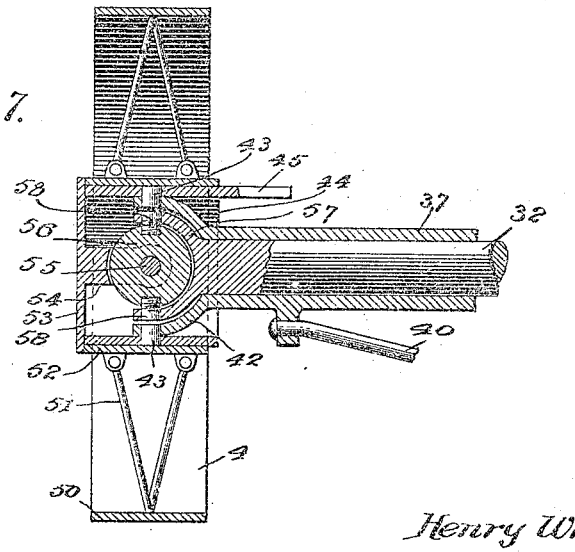

In the accompanying drawings, Figure 1 is a plan view of a motor vehicle embodying my invention, only so much thereof being shown as is necessary to an understanding of the same; Fig. 2 is a detail sectional view on an enlarged scale, taken on the line $x$ $x$ of Fig. 1, and looking in the direction of the arrows; Fig. 3 is a side elevation of the main driving wheel, to which the motive power is applied; Fig. 4 is a view of one of the bevel gears driven from the wheel shown in Fig. 3; Fig. 5 is a vertical sectional view of the front axle on an enlarged scale, taken on the line $y$ $y$ of Fig. 1, and looking in the direction of the arrows; Fig. 6 is a view of the sprocket-wheel shown in Fig. 5; and Fig. 7 is a vertical sectional view through one of the front wheels, being, in fact, an extension to the left of Fig. 5.

In the said drawings, 1 indicates the frame of a motor vehicle, supported on four ground wheels, the two rear wheels being indicated respectively by the reference numerals 2 and 3, and the front wheels by the reference numerals 4 and 5.

In the particular embodiment of my invention chosen for purposes of illustration, the rear wheels 2 and 3 are shown as mounted loosely upon the extremities of a non-rotating axle 6. The frame 1 supports a suitable motor of any approved description, from which power is derived to impart motion to a main gear wheel 7, which, in the present instance, is supported in the manner hereinafter set forth by means of a countershaft 8, mounted in suitable bearings on the frame 1. The gear 7 has mounted thereon a plurality of bevel pinions 9, three being shown in the present instance, said pinions being arranged with their axes or rotation radial with respect to the gear 7, said pinions being free to rotate on their said axes, and being carried around by the gear 7 as it rotates. On opposite sides of the gear 7 there are located bevel gears 10 and 11, which mesh with the pinions 9 on opposite sides thereof. The bevel gear 10 has a sleeve-like hub 12 loosely mounted on the shaft 8, the portion of said sleeve-like hub which projects in one direction from the body of the bevel gear forming a part of the bearing for the hub 13 of the main gear 7. The other portion of the sleeve-like hub 12, which extends in the opposite direction from the body of the bevel gear 10, has secured thereon a sprocket-wheel 14, from which the front wheels are driven. The bevel gear 11 has mounted thereon a plurality of bevel pinions 15, three being shown in the present instance, said pinions having their axes of rotation arranged radial with respect to the bevel gear 11, said bevel pinions being free to rotate on their own axes, and being carried around by the bevel gear 11 as it rotates. On opposite sides of the bevel gear 11 are located two bevel gears 16 and 17, which mesh with the pinions 15 on opposite sides thereof. These bevel gears 16 and 17 respectively drive the two rear wheels 2 and 3. To this end the hub 18 of the bevel gear 16 is keyed or otherwise secured to the shaft 8, said shaft having secured thereon at one end a sprocket-wheel 19, which, by means of a sprocket chain 20, drives a sprocket-wheel 21, carried by the wheel 2.

It will be noted that the hub 18 forms the remaining part of the bearing for the hub 13 of the main gear 7, and also a part of the bearing of the hub 22 of the bevel gear 11. The bevel gear 17 has a sleeve-like hub 23, loosely mounted on the countershaft 8, its extension in one direction completing the bearing for the hub 22 of the bevel gear 11, while its extension in the other direction has secured thereon a sprocket-wheel 24, which, by means of a sprocket chain 25, drives a sprocket-wheel 26 with which the wheel 3 is provided. The sprocket wheel 14 drives a sprocket chain 27, which extends to the front axle of the vehicle for the purpose of driving the front wheels 4 and 5.

28 indicates a sprocket-wheel around which the sprocket chain 27 passes, said sprocket-wheel 28 being provided with a plurality of bevel pinions 29, three being shown in the present instance, said pinions having their axes of rotation arranged radial with respect to the wheel 28. Said pinions are free to rotate upon their said axes, and are carried around by the sprocket-wheel 28 as it revolves.

30 and 31 indicate bevel gears located on opposite sides of the sprocket wheel 28, and meshing with the bevel pinions 29 thereof on opposite sides of said pinions. The front axle is divided, the bevel gear 30 being secured to the member 32 thereof which drives the wheel 4, while the bevel gear 31 is secured to the member 33 of the front axle which drives the wheel 5. The bevel gears 30 and 31 are respectively provided with hubs 34 and 35, which are extended towards each other so as to form a bearing for the hub 36 of the sprocket-wheel 28. The axle members 32 and 33 revolve respectively in fixed sleeves 37 and 38, connected at their inner ends by the arch or yoke 39, which spans the compensating gearing of the front axle. The outer ends of the sleeves 37 and 38 are connected by means of a truss rod 40, supported by struts 41 from the inner ends of said sleeves. It will thus be seen that said sleeves form, in effect, a bearing for the rotating divided axle 32 and 33, it being understood that this bearing is suitably secured to the main frame 1. Said sleeves may be also considered as constituting a nonrotating axle, since the journals on which the front wheels turn are pivoted to the outer ends of the respective sleeves, as will hereinafter appear.

The connection between the front wheels and the parts by which they are supported and rotated is the same on each side of the machine, and I will therefore describe in detail only the connections of the wheel 4, which is shown in detail in Fig. 7, it being understood that the connections of the wheel 5 are similar, but reversely arranged.

The sleeve 37 terminates at its outer end in a yoke 42, to which is pivoted, by means of central vertical pivots 43, a hollow cylindrical journal 44, which may be turned upon the vertical pivots 43, to effect the steering of the vehicle. This may be effected in any suitable way, as, for instance, by an arm 45, connected by a link 46 with a rack bar 47, driven by a pinion 48, on a steering shaft 49. It will be understood, of course, that the journal of the wheel 5 has a similar arm 45 and link 46, connected to the other end of the rack bar 47.

50 indicates the rim of the wheel, which is connected by spokes 51 with the hub 52, which hub fits upon the journal 44. The outer end of the hub 52 has secured to it a cap or cross piece 53, from which there extends inward a yoke 54, connected by a pivot 55 with a knuckle piece 56. The shaft member 32 terminates in a yoke 57, which is also pivotally connected to the knuckle piece 56 by means of pivots 58, located at right angles to the pivots 55.

It will be noted that the pivots 58, 55 and 43 are all in the same vertical plane, which is the central vertical plane of the wheel 4. It will be seen that, by reason of this construction, the steering wheels 4 and 5 may be turned into any desired position around the vertical axis formed by the pivots 43, for the purpose of steering the vehicle, without in any way affecting the rotary movement imparted by the rotating front axle, while at the same time the strains upon said axle and upon the connecting parts are reduced to a minimum.

Considering the structure as a whole it will be seen that motion imparted to the main gear 7 from a suitable motor mounted on the vehicle will be transmitted to all four of the ground wheels, so that all of the wheels act as driving wheels, while the front wheels also act as steering wheels. It will furthermore be seen that the gear 7, with its pinions 9, and the bevel gears 10 and 11 meshing therewith, serve to compensate and equalize the motion of the front and rear wheels, since the front wheels are driven from the bevel gear 10, while the rear wheels are driven from the bevel gear 11. Compensation and equalization between the rear wheels themselves is effected by the bevel gear 11, with its pinions 15, and the bevel gears 16 and 17, which mesh with said pinions, since the wheel 2 is driven from the bevel gear 16, while the wheel 3 is driven from the bevel gear 17. Similarly, compensation and equalization between the front wheels 4 and 5 are effected by the sprocket-wheel or gear 28, with its pinions 29, and the bevel gears 30 and 31 which mesh therewith, since the wheel 4 is driven from the bevel gear 30, while the wheel 5 is driven from the bevel gear 31. Thus, while all of the wheels are driven at a similar speed under normal conditions, each wheel is free to vary from that speed under controlling conditions independent of the motive power, while the said motive power is equally distributed to all four of the wheels.

It is obvious that various modifications in the details of construction may be made without departing from the principle of my invention.

I therefore do not wish to be understood as limiting myself strictly to the precise details of construction hereinbefore described and shown in the accompanying drawings.

Having thus fully described my invention, what I claim as new and desire to secure by Letters Patent is:—

A compensating gear for driving a vehicle comprising a shaft, a main gear wheel having a hub supported on said shaft, radial pinions supported on said main gear and rotating therewith, a sleeve journaled on said shaft and having one end extending into the hub of said main gear, a bevel gear carried by said sleeve and engaging said pinions on one side of said main gear, a second bevel gear having a hub supported on said shaft and engaging said pinions on the opposite side of said main gear, radial pinions journaled in said second bevel gear and rotating therewith, a gear 16 secured to said shaft between said second bevel gear and said main gear and engaging the pinions of said bevel gear on one side of said bevel gear, said gear 16 having a hub extending at one end into the hub of said main gear and coöperating with the sleeve of said first-mentioned bevel gear to form a bearing for said main gear and having its other end extending into the hub of the second bevel gear, a second sleeve mounted on said shaft and having one end extending into the hub of said second bevel gear and coöperating with the hub of the gear 16 to form a bearing therefor, and a gear 17 secured to said second sleeve and engaging the pinions of said bevel gear on the outer side of said bevel gear, substantially as described.

In testimony whereof, I affix my signature in presence of two witnesses.

HENRY WHITE.

Witnesses:
L. B. McNEAL,
HORACE J. CORROLD.